US011197249B2

(12) United States Patent
Akkarakaran et al.

(10) Patent No.: US 11,197,249 B2
(45) Date of Patent: Dec. 7, 2021

(54) TRANSMIT-POWER CONTROL MODE SELECTION

(71) Applicant: QUALCOMM Incorporated, San Diego, CA (US)

(72) Inventors: Sony Akkarakaran, Poway, CA (US); Tao Luo, San Diego, CA (US); Jung Ho Ryu, Fort Lee, NJ (US); Junyi Li, Chester, NJ (US); Hong Cheng, Bridgewater, NJ (US); Sudhir Kumar Baghel, Hillsborough, NJ (US); Kapil Gulati, Hillsborough, NJ (US); Wooseok Nam, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/934,720

(22) Filed: Jul. 21, 2020

(65) Prior Publication Data

US 2021/0037479 A1 Feb. 4, 2021

Related U.S. Application Data

(60) Provisional application No. 62/880,048, filed on Jul. 29, 2019.

(51) Int. Cl.
*H04W 4/029* (2018.01)
*H04W 52/28* (2009.01)
(Continued)

(52) U.S. Cl.
CPC ......... *H04W 52/283* (2013.01); *H04W 4/029* (2018.02); *H04W 24/10* (2013.01); *H04W 52/08* (2013.01); *H04W 52/10* (2013.01)

(58) Field of Classification Search
CPC ... H04W 52/283; H04W 52/10; H04W 52/08; H04W 24/10; H04W 4/029
(Continued)

(56) References Cited

U.S. PATENT DOCUMENTS 7,079,870 B2 * 7/2006 Vaidyanathan ........ H04B 7/043
455/561
10,129,902 B2 * 11/2018 Kaur ..................... H04W 72/12
(Continued)

FOREIGN PATENT DOCUMENTS

EP 3216305 A1 9/2017

OTHER PUBLICATIONS

International Search Report and Written Opinion—PCT/US2020/043101—ISA/EPO—dated Dec. 17, 2020.
(Continued)

*Primary Examiner* — Hai V Nguyen
(74) *Attorney, Agent, or Firm* — Patterson + Sheridan, L.L.P.; Timothy R. Hirzel

(57) ABSTRACT

Certain aspects of the present disclosure provide techniques for assigning or adjusting a transmit-power control mode, or parameters of a transmit-power at a user equipment used in sidelink communications. In some examples, the disclosure describes determining a user equipment (UE) is connected to the BS, and configuring the UE to use a first transmit-power control mode for determining a transmit-power used for transmitting wireless data over a sidelink based on the BS being positioned indoors.

28 Claims, 12 Drawing Sheets

(51) Int. Cl.
*H04W 24/10* (2009.01)
*H04W 52/08* (2009.01)
*H04W 52/10* (2009.01)

(58) Field of Classification Search
USPC .................................................. 455/522, 69
See application file for complete search history.

(56) References Cited

U.S. PATENT DOCUMENTS

| | | | | |
|---|---|---|---|---|
| 10,231,193 | B2* | 3/2019 | Lee | H04W 4/70 |
| 10,349,360 | B2* | 7/2019 | Lee | H04W 8/00 |
| 10,477,556 | B2* | 11/2019 | Aiba | H04W 72/0473 |
| 10,542,501 | B2* | 1/2020 | Lee | H04W 52/30 |
| 10,694,579 | B2* | 6/2020 | Tsuda | H04W 88/04 |
| 10,764,837 | B2* | 9/2020 | Lee | H04W 52/325 |
| 10,869,281 | B2* | 12/2020 | Lee | H04W 4/70 |
| 10,880,895 | B2* | 12/2020 | Gordaychik | H04W 8/22 |
| 10,938,733 | B2* | 3/2021 | Ganesan | H04L 1/08 |
| 10,986,622 | B2* | 4/2021 | Zhang | H04B 7/088 |
| 2017/0142741 | A1* | 5/2017 | Kaur | H04W 76/14 |
| 2017/0181011 | A1* | 6/2017 | Yu | H04W 52/04 |
| 2017/0290020 | A1* | 10/2017 | Aiba | H04W 8/005 |
| 2018/0014262 | A1* | 1/2018 | Lee | H04W 52/30 |
| 2018/0020412 | A1* | 1/2018 | Lee | H04W 4/70 |
| 2018/0146507 | A1* | 5/2018 | Tsuda | H04W 68/02 |
| 2018/0242190 | A1* | 8/2018 | Khoryaev | H04L 47/283 |
| 2018/0249374 | A1* | 8/2018 | Park | H04W 72/1263 |
| 2018/0324869 | A1* | 11/2018 | Phuyal | H04W 72/14 |
| 2018/0359786 | A1* | 12/2018 | Phuyal | H04W 48/20 |
| 2019/0059094 | A1* | 2/2019 | Kaur | H04W 72/121 |
| 2019/0150102 | A1* | 5/2019 | Lee | H04L 5/0092 455/522 |
| 2019/0253982 | A1* | 8/2019 | Lee | H04L 5/0092 |
| 2019/0281587 | A1* | 9/2019 | Zhang | H04L 5/0053 |
| 2019/0356451 | A1* | 11/2019 | Zhang | H04L 5/0032 |
| 2019/0363843 | A1* | 11/2019 | Gordaychik | H04L 1/1854 |
| 2019/0364492 | A1* | 11/2019 | Azizi | H04W 48/16 |
| 2020/0028638 | A1* | 1/2020 | Liu | H04J 13/0062 |
| 2020/0029283 | A1* | 1/2020 | Lei | H04W 72/14 |
| 2020/0053675 | A1* | 2/2020 | Khoryaev | H04W 56/00 |
| 2020/0053734 | A1* | 2/2020 | Aiba | H04W 72/0473 |
| 2020/0112400 | A1* | 4/2020 | Lee | H04W 76/11 |
| 2020/0145932 | A1* | 5/2020 | Lee | H04W 4/70 |
| 2020/0186290 | A1* | 6/2020 | Zhang | H04W 4/46 |
| 2020/0221429 | A1* | 7/2020 | Li | H04L 5/0053 |
| 2020/0229104 | A1* | 7/2020 | MolavianJazi | H04W 52/146 |
| 2020/0235898 | A1* | 7/2020 | Loehr | H04W 16/14 |
| 2020/0252990 | A1* | 8/2020 | Ganesan | H04W 76/19 |
| 2020/0274656 | A1* | 8/2020 | Gordaychik | H04L 1/1854 |
| 2020/0288313 | A1* | 9/2020 | Kunz | H04W 12/06 |
| 2020/0288320 | A1* | 9/2020 | Kunz | H04W 12/106 |
| 2020/0305169 | A1* | 9/2020 | Loehr | H04W 72/0493 |
| 2020/0305174 | A1* | 9/2020 | Ganesan | H04W 84/20 |
| 2020/0314760 | A1* | 10/2020 | Ye | H04W 74/006 |
| 2020/0314819 | A1* | 10/2020 | Loehr | H04W 72/042 |
| 2020/0314955 | A1* | 10/2020 | Velev | H04W 52/0216 |
| 2020/0314960 | A1* | 10/2020 | Basu Mallick | H04W 72/1242 |
| 2020/0322095 | A1* | 10/2020 | Park | H04L 1/1864 |
| 2020/0329437 | A1* | 10/2020 | MolavianJazi | H04W 52/146 |
| 2020/0336872 | A1* | 10/2020 | Basu Mallick | H04W 4/029 |
| 2020/0337083 | A1* | 10/2020 | Loehr | H04W 72/14 |
| 2020/0351409 | A1* | 11/2020 | Karampatsis | H04W 12/63 |
| 2020/0351833 | A1* | 11/2020 | Chae | H04W 52/383 |
| 2020/0359419 | A1* | 11/2020 | Berg | H04W 52/245 |
| 2020/0367177 | A1* | 11/2020 | Lee | H04W 76/14 |
| 2020/0383061 | A1* | 12/2020 | Yang | H04W 72/14 |
| 2020/0396024 | A1* | 12/2020 | Ganesan | H04L 1/1812 |
| 2020/0396691 | A1* | 12/2020 | Wernersson | H04W 52/08 |
| 2021/0021536 | A1* | 1/2021 | Ganesan | H04L 45/20 |
| 2021/0051630 | A1* | 2/2021 | Chae | H04W 72/02 |

OTHER PUBLICATIONS

MCC Support: "Draft Report of 3GPP TSG RAN WG1 #97 v0.3.0 (Reno, USA, May 13-17, 2019)", 3GPP Draft, 3GPPTSG-RAN WG1 Meeting #98, R1-190xxxx, Draft_Minutes_Report_RAN1#97_V030, 3rd Generation Partnership Project (3GPP), Mobile Competence Centre, 650, Route Deslucioles, F-06921 Sophia-Antipolis Cedex, France, vol. RAN WG1, No. Prague, Czech Rep, Aug. 26, 2019-Aug. 30, 2019, May 29, 2019 (May 29, 2019), XP051740228, pp. 1-157.

Partial International Search Report—PCT/US2020/043101—ISA/EPO—dated Oct. 23, 2020.

SAMSUNG: "On Sidelink Power Control", 3GPP Draft, 3GPP TSG RAN WG1 #97, R1-1906950, On Sidelink Power Control, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728400, 8 pages, Retrieved from the Internet: URL: http://www.3gpp.org/ftp/Meetings%5F3GPP%5FSYNC/RAN1/Docs/R1%2D1906950%2Ezip [retrieved on May 13, 2019] pp. 1-4, section 2.

* cited by examiner

TRANSMIT-POWER CONTROL MODE SELECTION

CROSS-REFERENCE TO RELATED APPLICATION(S)

This application claims benefit of and priority to U.S. Provisional Application No. 62/880,048, filed Jul. 29, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for selecting a transmit-power control mode for controlling transmitter power in a sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit-power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station. The method generally includes determining a position of a user equipment (UE), selecting one of a first transmit-power control mode or a second transmit-power control mode for determining a transmit-power used for transmitting wireless data over a sidelink based on the determined position of the UE, and configuring the UE to use the selected one of the first transmit-power control mode or the second transmit-power control mode.

Certain aspects provide a method for wireless communication by a user equipment (UE). The method generally includes transmitting a signal to a second UE over a sidelink, receiving, from the second UE, a report indicating a measurement of the signal as received by the second UE, determining whether the measurement satisfies a threshold, and selecting, based on the determination of whether the measurement satisfies the threshold, one of: (i) a power control mode for determining a transmit-power used for transmitting wireless data over the sidelink, or (ii) a transmit-power level for transmitting wireless data over the sidelink.

Certain aspects provide an apparatus for wireless communication. The apparatus generally includes a processor and a memory communicatively coupled to the processor, wherein the processor is configured to: determine a UE has connected to the BS, and configure the UE to use a first transmit-power control mode for determining a transmit-power used for transmitting wireless data over a sidelink based on the BS being positioned indoors.

Certain aspects provide an apparatus for wireless communication. The apparatus generally includes a processor and a memory communicatively coupled to the processor, wherein the processor is configured to: determine a position of a user equipment (UE), select one of a first transmit-power control mode or a second transmit-power control mode for determining a transmit-power used for transmitting wireless data over a sidelink based on the determined position of the UE, and configure the UE to use the selected one of the first transmit-power control mode or the second transmit-power control mode.

Certain aspects provide an apparatus for wireless communication. The apparatus generally includes a processor and a memory communicatively coupled to the processor, wherein the processor is configured to: transmit a signal to a second UE over a sidelink, receive, from the second UE, a report indicating a measurement of the signal as received by the second UE, determine whether the measurement satisfies a threshold, and select, based on the determination of whether the measurement satisfies the threshold, one of: (i) a power control mode for determining a transmit-power used for transmitting wireless data over the sidelink, or (ii) a transmit-power level for transmitting wireless data over the sidelink.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
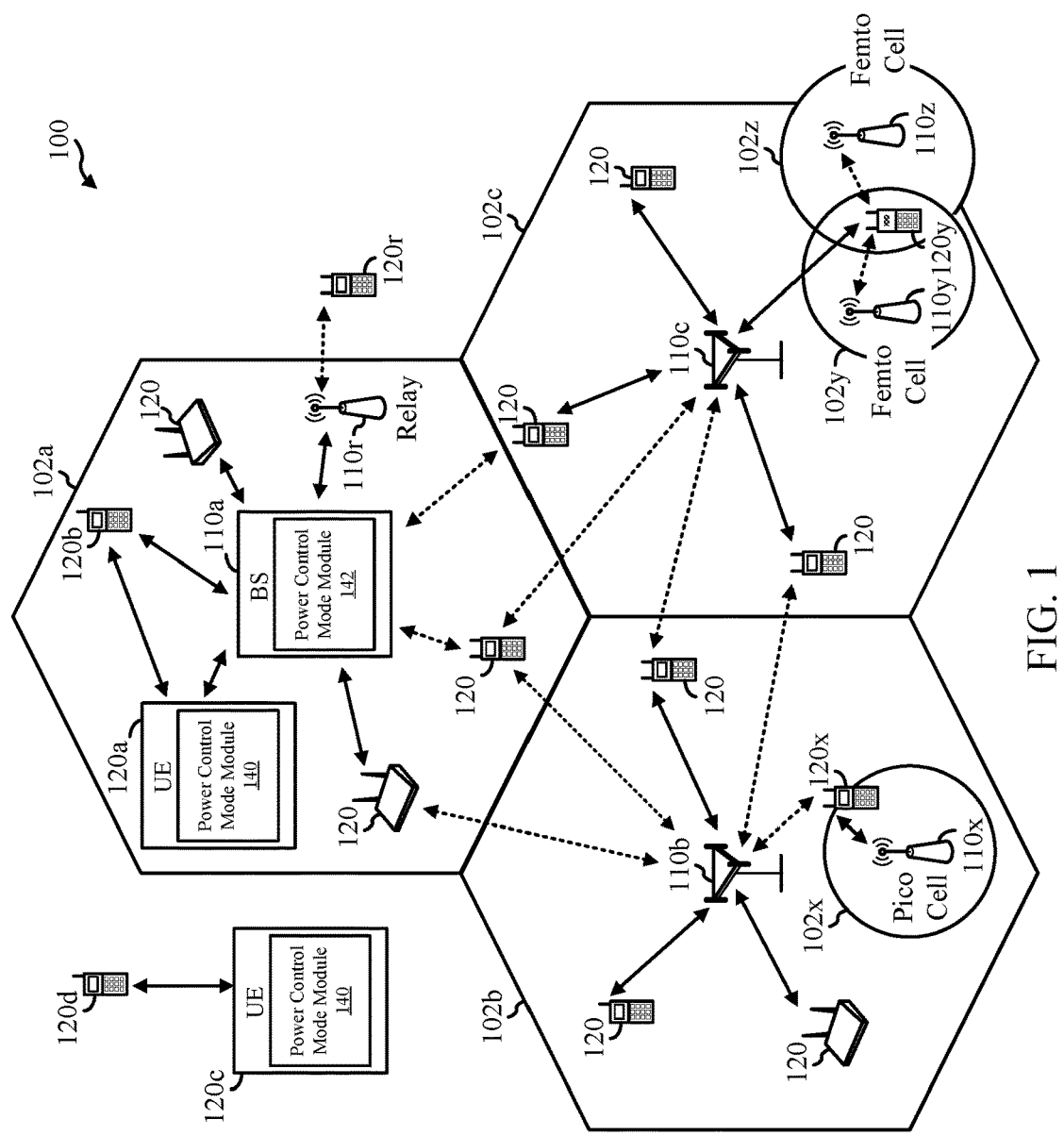
FIG. 1 is a block diagram conceptually illustrating an example telecommunications system, in accordance with certain aspects of the present disclosure.

Aspects of the present disclosure provide apparatus, methods, processing systems, and computer readable mediums for selecting a transmit-power control mode for controlling transmitter power of a user equipment (UE) in a sidelink communication.

New radio (NR) provides for limiting base station (BS) transmission power levels (e.g., effective isotropic radiated power (EIRP) levels) according to a BS implementation. In one example, the deployment configuration of a BS may be a determining factor of the transmission power limits of that BS. More specifically, certain examples provide for limits of transmission power levels (e.g., a maximum transmit-power level and/or an acceptable range of transmit-power) based on whether the BS is located indoor or outdoor. Such limitations help preserve power and reduce interference with other signals by keeping the transmission power levels limited to a particular range. For example, a maximum transmit-power may be lower for a BS indoors than for a BS outdoors due to a number of factors, including: proximity to humans, electro-static environment characteristics, signal reflection, and signal interference. Thus, the indoor/outdoor implementation of the BS may determine the transmit-power levels of the BS in order to provide ideal levels.

Similarly, transmit-power levels of UEs are also limited. However, in some cases, the limitations include more than just a range of power levels or a maximum power level. Instead, transmission power limitations of a UE may be controlled by open loop and/or closed loop power level control modes.

Conventionally, the transmit-power level control mode for a UE is not determined based on whether the UE is indoor or outdoor, thus any transmit-power level of the UE is determined with no regard to the UE position. Accordingly, in order to preserve power and reduce interference with other signals, there is a desire to adjust power level control modes of a UE as a function of one or more of a position of the UE, a position of a BS servicing the UE, and/or one or more signal measurements between the UE and another UE in a sidelink communication.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the BS 110a has a power control mode module 142 that may be configured for selecting a transmit-power control mode and/or one or more transmit-power parameters for use by a UE in sidelink communication, and assigning the selected transmit-power control mode and transmit-power parameters to the UE by transmitting signaling to a UE indicative of the selected transmit-power control mode, according to aspects described herein. Further, as shown in FIG. 1, the UE 120a has a power control mode module 140 that may be configured for receiving an indication of a transmit-power control mode and/or one or more transmit-power parameters for use in a sidelink communication, and selecting a transmit-power control mode and/or one or more transmit-power parameters based on received signal measurement reports, according to aspects described herein.

As illustrated in FIG. 1, the wireless communication network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). ABS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit-power levels, different coverage areas, and different impact on interference in the wireless communication network 100. For example, macro BS may have a high transmit-power level (e.g., 20 Watts) whereas pico BS, femto BS, and relays may have a lower transmit-power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using time-division duplexing (TDD). Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In some examples of the wireless communication network 100, sidelink communication may be established between UEs without necessarily relying on UE ID or control information from a BS. For example, UE 120c may initiate a sidelink communication with UE 120d or UE 120a without relying on a direct connection with a BS (e.g., BS 110a) if the UE 120c is outside of cell 102a range. Any of the UEs (120a-120d) may function as a scheduling entity or a primary sidelink device, while the other UE may function as a subordinate entity or a non-primary (e.g., secondary) sidelink device. Further, the UEs (120a-120d) may be configured to perform beam management procedures for a sidelink. Accordingly, one or more of the UEs may function as a scheduling entity in a device-to-device (D2D), peer-to-peer (P2P), or vehicle-to-vehicle (V2V) network, and/or in a mesh network to initiate and/or schedule certain beam management procedures.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

In certain aspects, the UE 120 (e.g., 120a-120d) may have circuitry and processing resources capable of obtaining position, or location related measurements. Location related measurements performed by UE 120 may include measurements of signals received from satellites belonging to a satellite positing system (SPS) or Global Navigation Satellite System (GNSS) such as a global positioning system (GPS), global navigation satellite system (GLONASS), Galileo or Beidou, or any other suitable local or regional SPS such as Indian regional navigation satellite system (IRNSS), European geostationary navigation overlay service (EGNOS), or wide area augmentation system (WAAS). Location related measurements performed by UE 120 may include measurements of signals received from terrestrial transmitters fixed at known locations (e.g., such as BS 110).

UE 120 or a separate location server with a location management function (LMF), to which UE 120 may send the measurements, may then obtain a location estimate for the UE 120 based on these location related measurements using any one of several UE-based and/or UE-assisted positioning methods such as, for example, GNSS, assisted GNSS (A-GNSS), advanced forward link trilateration (AFLT), observed time difference of arrival (OTDOA), wireless local area network (WLAN) (also referred to as WiFi) positioning, or enhanced cell ID (ECID) or combinations thereof. In some of these techniques (e.g. A-GNSS, AFLT and OTDOA), pseudo-ranges or timing differences may be measured at UE 120 relative to three or more terrestrial transmitters (e.g. BS 110) fixed at known locations or relative to four or more satellites with accurately known orbital data, or combinations thereof, based at least in part, on pilots, positioning reference signals (PRS) or other positioning related signals transmitted by the transmitters or satellites and received at the UE 120. As noted, a location server may include an LMF, an evolved serving mobile location center (eSMLC), or the like.

For example, with a UE assisted position method, a first UE 120a may perform location measurements (e.g. measurements of received signal strength indication (RSSI), round trip signal propagation time (RTT), reference signal time difference (RSTD), reference signal received power (RSRP), and/or reference signal received quality (RSRQ)) of an access link and/or a sidelink, and send the measurements to a BS 110a or a second UE 120b for computation of a location estimate for the first UE 120a.

With a UE based position method, UE 120 may obtain location measurements (e.g. which may be the same as or similar to location measurements for a UE assisted position method) and may compute its own location (e.g. with the help of assistance data received from a location server with LMF or eSMLC, or broadcast by a BS 110). With a network based position method, one or more BSs (e.g. 110a-110c) may obtain location measurements (e.g. measurements of RSSI, RTT, RSRP, RSRQ, or time of arrival (TOA) (e.g., time difference of arrival (TDOA), etc.) for signals transmitted by UE 120) and/or may receive measurements obtained by UE 120, and may send the measurements to a location server with LMF for computation of a location estimate for UE 120.

Figure 2:
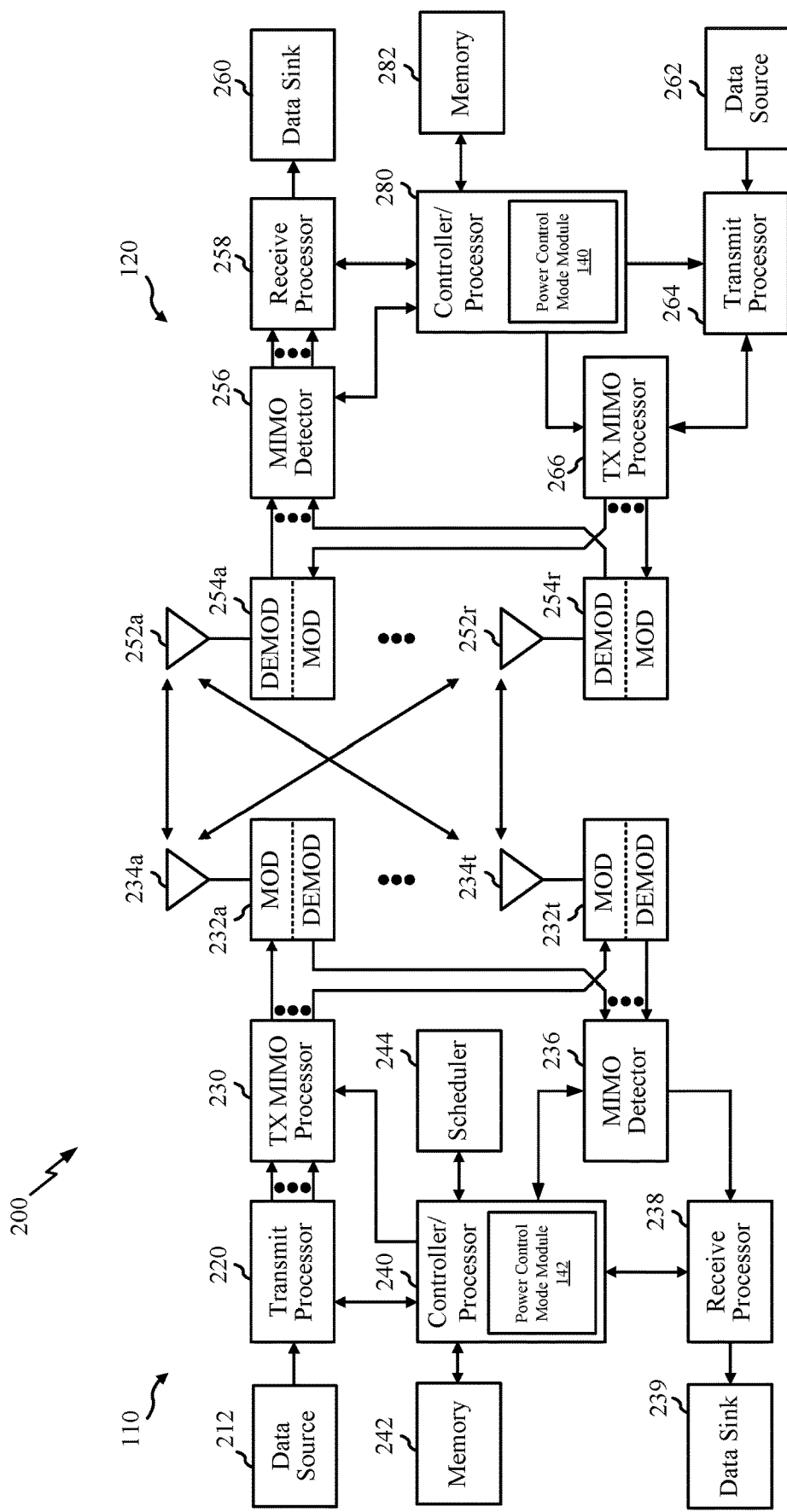
FIG. 2 illustrates example components of a BS and a UE, which may be used to implement aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a power control mode module 142 that may be configured for selecting a transmit-power control mode and/or one or more transmit-power parameters for use by a UE in sidelink communication, and assigning the selected transmit-power control mode and transmit-power parameters to the UE by transmitting signaling to a UE indicative of the selected transmit-power control mode, according to aspects described herein. For example, as shown in FIG. 2, the controller/processor 280 of the UE 120 has a power control mode module 140 that may be configured for receiving an indication of a transmit-power control mode and/or one or more transmit-power parameters for use in a sidelink communication, and selecting a transmit-power control mode and/or one or more transmit-power parameters based on received signal measurement reports, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
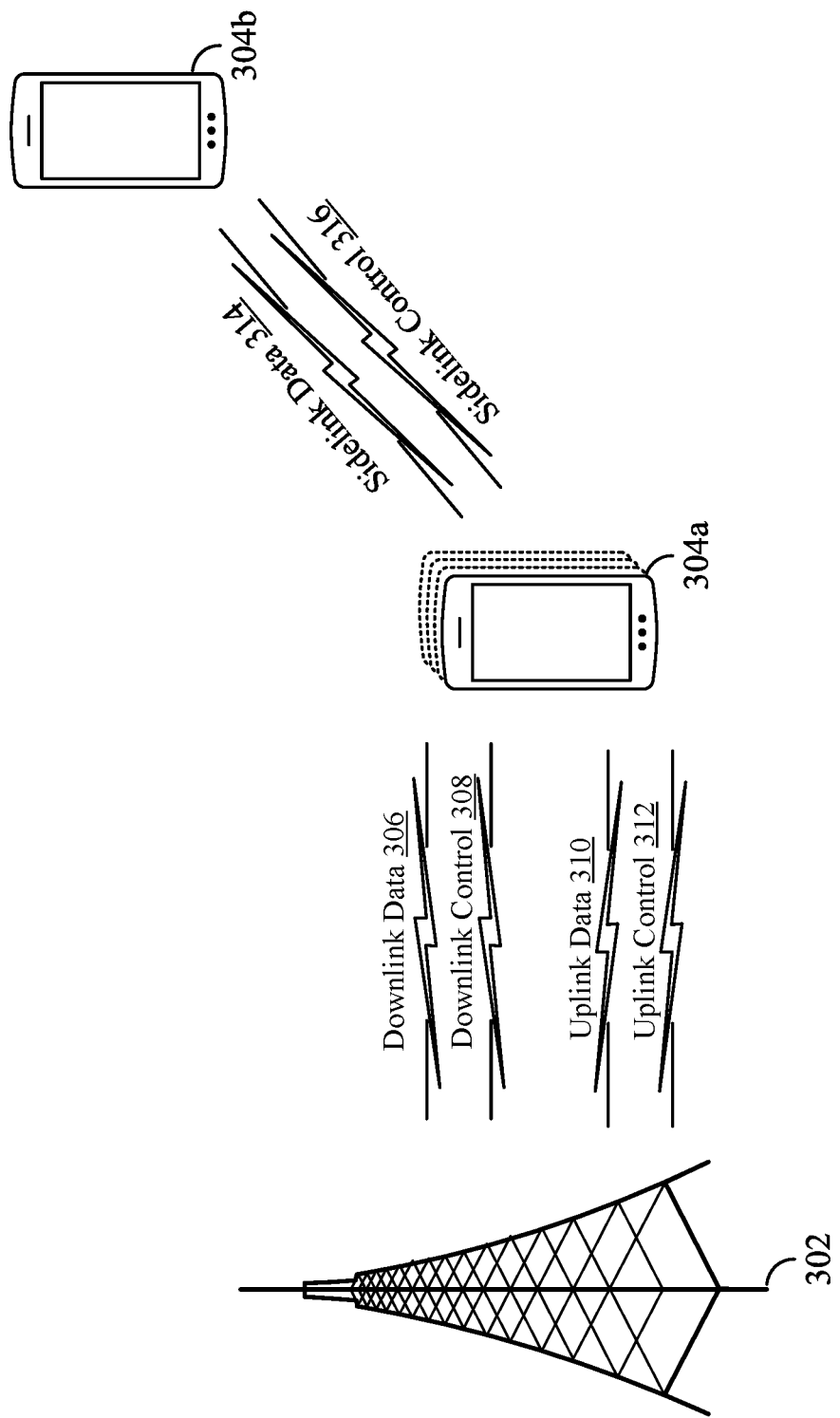
FIG. 3 is a diagram illustrating an example base station (BS) communicating with one or more user equipment (UEs), in accordance with certain aspects of the present disclosure.

Referring now to FIG. 3, a block diagram illustrates a BS 302 and a plurality of user equipment 304 (e.g., 304a and 304b). Here, the BS 302 may correspond to the BSs 110 (e.g., 110a-110c and 110x-110z), the UE 120c, or any other suitable node in the communication network 100. In additional examples, the BS 302 may correspond to the BS 110 of FIG. 2. Similarly, in various examples, the UE 304 may correspond to the UE 120 (e.g., 120a-120d) or any other suitable node in the communication network 100. In additional examples, the UE 304 may correspond to the UE 120 of FIG. 2.

As illustrated in FIG. 3, the BS 302 may transmit data 306 to one or more UEs 304 (the data may be referred to as downlink data). In accordance with certain aspects of the present disclosure, the term downlink may refer to a point-to-multipoint transmission originating at the BS 302. Broadly, the BS 302 is a node or device responsible for scheduling traffic in a wireless communication network, including the downlink transmissions and, in some examples, uplink data 310 transmissions from one or more UEs 304 to the BS 302. Another way to describe the system may be to use the term broadcast channel multiplexing. In accordance with aspects of the present disclosure, the term uplink may refer to a point-to-point transmission originating at a UE 304. Broadly, the UE 304 is a node or device that receives scheduling control information, including but not limited to scheduling grants, synchronization or timing information, or other control information from another entity in the wireless communication network such as the BS 302.

The BS 302 may transmit control information 308 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more UEs 304. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 310 and/or downlink data 306 including one or more data channels, such as a physical downlink shared channel (PDSCH) or a physical uplink shared channel (PUSCH) (and, in some examples, system information blocks (SIBs)), may be additionally transmitted between the BS 302 and the UE 304. Transmissions of the control and data information may be organized by subdividing a carrier, in time, into suitable transmission time intervals (TTIs).

Furthermore, the UEs 304 may transmit uplink control information 312 on a control channel including one or more uplink control channels to the BS 302. Uplink control information may include a variety of packet types and categories, including pilots, reference signals, and information configured to enable or assist in decoding uplink data transmissions. In some examples, the control information 312 may include a scheduling request (SR), i.e., request for the BS 302 to schedule uplink transmissions. Here, in response to the SR transmitted on the control channel, the BS 302 may transmit downlink control information 308 that may schedule the TTI for uplink packet transmissions.

In some examples, UEs such as a first UE 304a and a second UE 304b may utilize sidelink signals for direct D2D communication. Sidelink signals may include sidelink data 314 and sidelink control 316. Sidelink control information 316 may include a source transmit signal (STS), a direction selection signal (DSS), a destination receive signal (DRS), and a physical sidelink HARQ indicator channel (PSHICH).

The DSS/STS may provide for a UE 304 to request a duration of time to keep a sidelink channel available for a sidelink signal; and the DRS may provide for the UE 304 to indicate availability of the sidelink channel, e.g., for a requested duration of time. An exchange of DSS/STS and DRS signals (e.g., handshake) may enable different UEs performing sidelink communications to negotiate the availability of the sidelink channel prior to communication of the sidelink data 314 information (traffic). The PSHICH may include HARQ acknowledgment information and/or a HARQ indicator from a destination device, so that the destination may acknowledge data received from a source device.

In some configurations, any one of the UEs, such as the first UE 302a or the second UE 302b, may be responsible for initiating and/or scheduling traffic in a D2D communication, including the communication of sidelink data 314 and sidelink control information 316, and maintenance of the sidelink communication channel(s). For example, the first UE 302a may be responsible for scheduling and/or initiating signal measurement procedures (e.g., received signal strength indication (RSSI) measurements, reference signal received power (RSRP) measurements, reference signal received quality (RSRQ) measurements, etc.) and power control mode selection procedures between the first UE 302a and the second UE 302b, as disclosed herein.

The channels or carriers illustrated in FIG. 3 are not necessarily all of the channels or carriers that may be utilized between a BS 302 and UEs 304, and those of ordinary skill in the art will recognize that other channels or carriers may be utilized in addition to those illustrated, such as other data, control, and feedback channels.

Figure 4:
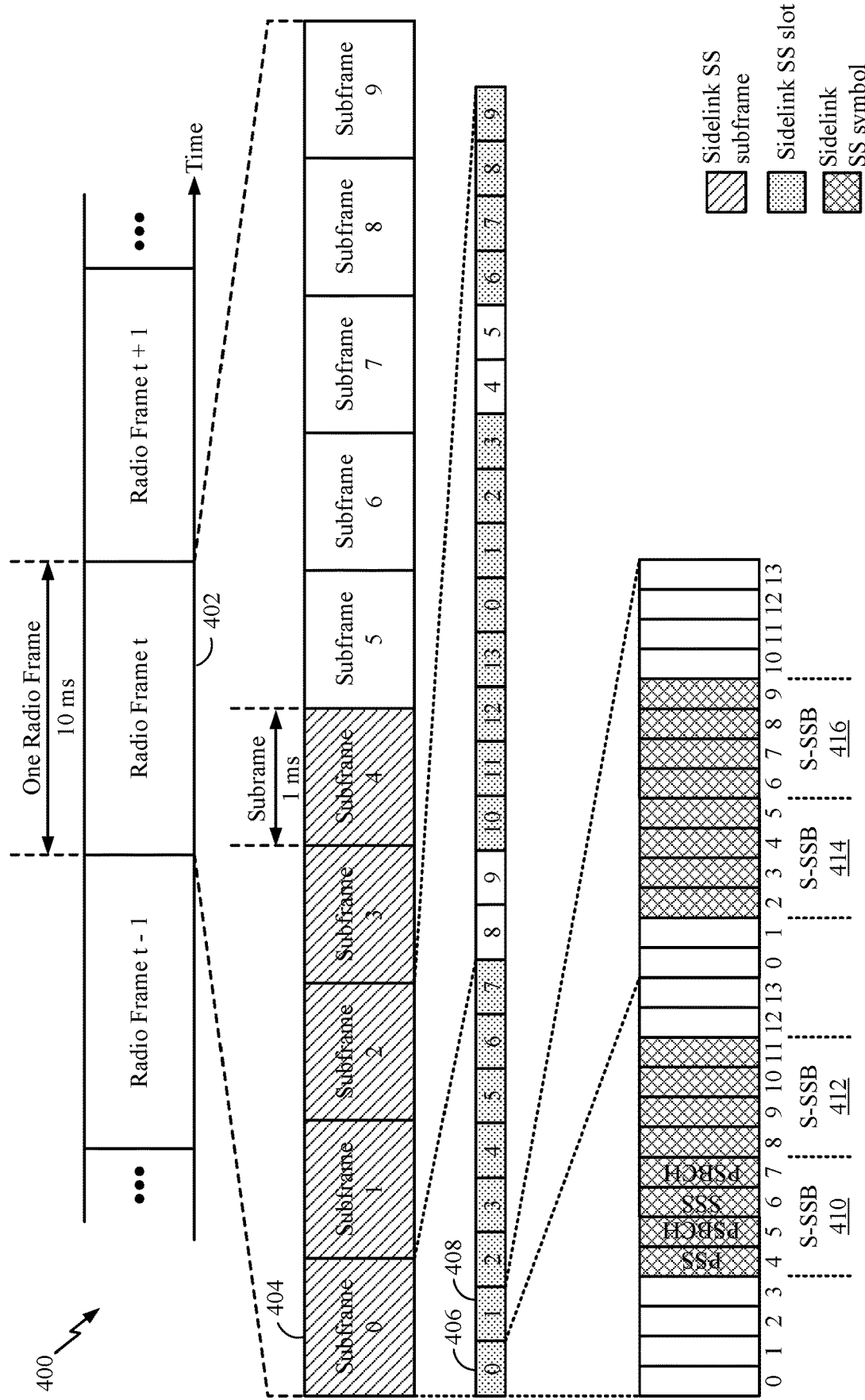
FIG. 4 is a diagram illustrating an example frame format for NR, in accordance with certain aspects of the present disclosure.

FIG. 4 is a diagram showing an example of a frame format 400 for NR. The transmission timeline for each data transmission and reception may be partitioned into units of radio frames 402. In NR, the basic transmission time interval (TTI) may be referred to as a slot. In NR, a subframe may contain a variable number of slots (e.g., 1, 2, 4, 8, 16, . . . , N slots) depending on the subcarrier spacing (SCS). NR may support a base SCS of 15 KHz and other SCS may be defined with respect to the base SCS (e.g., 30 kHz, 60 kHz, 120 kHz, 240 kHz, etc.). In the example shown in FIG. 4, the SCS is 120 kHz. As shown in FIG. 4, the subframe 404 (subframe 0) contains 8 slots (slots 0, 1, . . . , 7) with a 0.125 ms duration. The symbol and slot lengths scale with the subcarrier spacing. Each slot may include a variable number of symbol (e.g., OFDM symbols) periods (e.g., 7 or 14 symbols) depending on the SCS. For the 120 kHz SCS shown in FIG. 4, each of the slot 406 (slot 0) and slot 408 (slot 1) includes 14 symbol periods (slots with indices 0, 1, . . . , 13) with a 0.25 ms duration.

In sidelink, a sidelink synchronization signal block (S-SSB), referred to as the SS block or SSB, is transmitted. The SSB may include a primary SS (PSS), a secondary SS (SSS), and/or a two symbol physical sidelink broadcast channel (PSBCH). In some examples, the SSB can be transmitted up to sixty-four times with up to sixty-four different beam directions. The up to sixty-four transmissions of the SSB are referred to as the SS burst set. SSBs in an SS burst set may be transmitted in the same frequency region, while SSBs in different SS bursts sets can be transmitted in different frequency regions.

In the example shown in FIG. 4, in the subframe 404, SSB is transmitted in each of the slots (slots 0, 1, . . . , 7). In the example shown in FIG. 4, in the slot 406 (slot 0), an SSB 410 is transmitted in the symbols 4, 5, 6, 7 and an SSB 412 is transmitted in the symbols 8, 9, 10, 11, and in the slot 408 (slot 1), an SSB 414 is transmitted in the symbols 2, 3, 4, 5 and an SSB 416 is transmitted in the symbols 6, 7, 8, 9, and so on. The SSB may include a primary SS (PSS), a secondary (SSS), and a two symbol physical sidelink broadcast channel (PSBCH). The PSS and SSS may be used by UEs to establish sidelink communication (e.g., transmission and/or reception of data and/or control channels). The PSS may provide half-frame timing, the SS may provide cyclic prefix (CP) length and frame timing. The PSBCH carries some basic system information, such as system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), and other system information (OSI) can be transmitted on a physical sidelink shared channel (PSSCH) in certain subframes.

Example Techniques for Sidelink Transmit-Power Control Mode Selection

In UEs, transmit-power control modes are used to make sure the UE is transmitting at a sufficient level of power. For example, if the UE is transmitting at an unnecessarily high a level of power, the amount of power required for a communication will result in relatively rapid battery power consumption and may cause interference with other receivers nearby. Conversely, if the UE is transmitting signals using a level of power that is too low, communication with the UE may deteriorate caused by high error rates and retransmissions resulting in higher latency and also relatively rapid battery power consumption. Particularly in sidelink communications, UE mobility may require UEs to dynamically adjust power control modes as a UE position and/or environment changes.

Thus, certain aspects of the disclosure relate to techniques for controlling sidelink transmit-power levels and for changing power level control modes of a UE based on one or more of: a position of the UE, a position of a BS servicing the UE, and/or one or more signal measurements between the UE and another UE in a sidelink communication.

Sidelink power control may be defined as the means by which power for sidelink physical channels and signals is controlled to ensure that sidelink communications (e.g., sidelink data 314 and/or sidelink control 316) are effectively transmitted and received by one or more UEs at an appropriate power level. In the case of a transmission, the appropriate power level relates to the power needed for proper decoding of the information transmitted over the physical channel. The appropriate transmit-power for sidelink communications will depend on the channel properties, including the channel attenuation and the noise and interference level at the receiver side. As described herein, transmit-power control may be based on one or more of an open-loop power control mode, or a closed loop power control mode. In some cases, the appropriate transmit-power for sidelink communications may be based on the presence or absence of cell coverage.

According to certain aspects, an open-loop power control mode on a UE may support path-loss compensation, wherein the UE estimates the sidelink transmission path-loss based on measurements of signals received over the sidelink and sets its own sidelink transmission power accordingly. In one example, the open-loop power control mode provides a UE with a means to adjust its transmit-power so that the power of a signal received by a receiver aligns, or is roughly equal to a "target received power" (Po). It should be noted that Po may be part of a power control parameter of a UE configured by a BS, or a UE configured parameter, that may depend on one or more of a target data rate or a noise and interference level experienced at the receiver. In one example scenario involving an indoor BS and an indoor sidelink communication, a UE may estimate a sidelink transmission path-loss based on measurements of signals received by the UE over one or more of the sidelink communication from another UE and/or an access link communication from the BS. Based on this estimation, the UE can estimate a sidelink transmit-power that will result in a received power that is close to Po. The UE can then adjust the transmit-power accordingly.

According to certain aspects, a closed-loop power control mode on a UE is based on explicit (e.g., transmit-power control (TPC) commands) and/or implicit transmit-power control commands received from a BS and/or another UE. These power control commands may be determined based on measurements of a signal previously transmitted by the UE and measured at a receiving entity. For example, a first UE may transmit a signal over a sidelink to a second UE. The second UE receives the signal and performs power measurements to estimate path-loss and/or channel quality. For example, the second UE can perform sidelink power measurements using the S-SSB (e.g., 410, 412, 414, 416) of the transmitted signal. Generally, the second UE may communicate a TPC command to the first UE to adjust the transmit-power at the first UE. However, if the first UE and the second UE are in the same cell, the second UE may use a BS to relay the TPC to the first UE. Moreover, in some aspects, the BS may generate its own TPC to control sidelink transmit-power based on interference between the sidelink and an access link.

Figure 5:
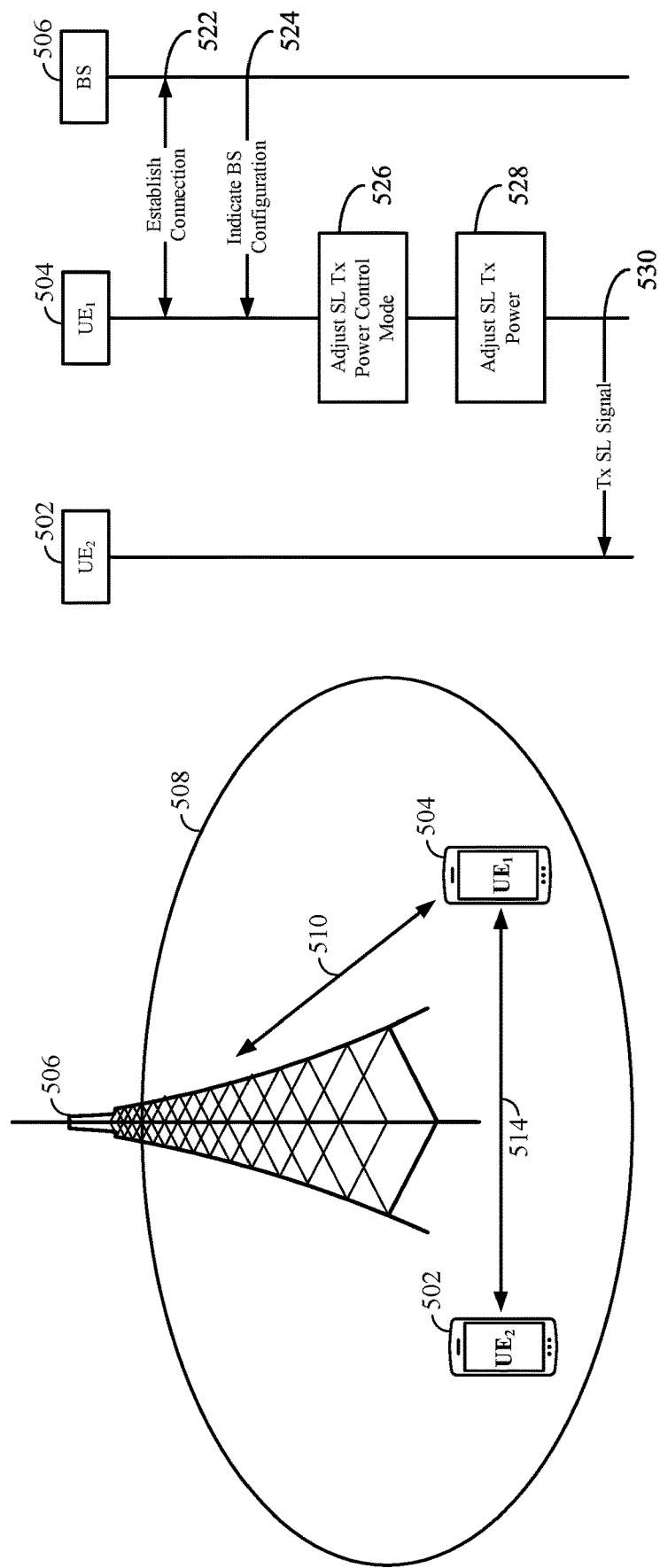
FIG. 5 is a diagram illustrating an exemplary scenario for adjusting a transmit-power control mode for controlling a sidelink transmit-power level at a UE based on a base station configuration, in accordance with certain aspects of the present disclosure.

Examples of Transmit-Power Control Mode Selection Based on Base Station Deployment FIG. 5 is a diagram illustrating an exemplary scenario for adjusting a power control mode for controlling a sidelink transmit-power level at a UE based on a BS deployment. In this example, a first UE 504 is within cell coverage 508, and is connected to both a BS 506 via an access link 510, and a second UE 502 via a sidelink 514.

In some aspects of the disclosure, the deployment of the BS 506 may be determinative of a sidelink transmit-power control mode at the first UE 504. For example, the BS 506 may be deployed as an indoor BS 506, where the cell coverage 508 includes an indoor area as well as an outdoor area adjacent to the indoor area. In such a configuration, the first UE 504 and the second UE 502 may communicate over a sidelink 514 while positioned within the indoor area and/or the adjacent outdoor area. In such a deployment, the BS may indicate to the first UE 504 an "indoor configuration" that corresponds to a sidelink transmit-power control mode and/or other transmit-power parameters. In some examples, an indoor configuration may require an open-loop power control mode for sidelink transmit-power control, and may include parameters that correspond to a reduced maximum transmit-power value, a reduced Po, etc.

In some aspects of the disclosure, the BS 506 may be deployed as an outdoor BS 506, where the cell coverage 508 includes a generally outdoor area. In such a deployment, the BS may indicate to the first UE 504 an "outdoor configuration" that corresponds to, for example a closed-loop power control mode for sidelink transmit-power control, and may include parameters that correspond to an increased maximum transmit-power value and Po relative to the indoor configuration.

It should be noted that the BS 506 may indicate its deployment configuration to the first UE either implicitly or explicitly. In one example, the first UE 504 is preconfigured according to a wireless communication standard, or previously configured by the BS 506 to include one or more transmit-power control modes and/or parameters indexed according to a particular BS 506 deployment configuration. In such an example, the BS 506 may communicate an indication of its deployment configuration to the first UE 504, and the first UE 504 may implement the particular transmit-power control modes and/or parameters associated with the deployment. In another example, the BS 506 may explicitly signal a particular transmit-power control modes and/or parameters to the first UE 504.

In some aspects of the disclosure, the BS 506 and the first UE 504 establish a connection 522 on an access link (AL) for communication. At this point, the BS 506 determines that the first UE 504 is connected it, and proceeds to send the first UE 504 a signal 524 configured to indicate the BS 506 deployment configuration. In some configurations, the BS 506 communicates the deployment configuration to the first UE 504 over one or more of a system information block (SIB) or a radio resource control (RRC) message. Upon receiving the signal 524, the first UE 504 adjusts, at a first block 526, the sidelink transmit-power control mode that corresponds to the BS 506 deployment configuration. The first UE 504 may then, at a second block 528, adjust the sidelink transmit-power according to the transmit-power control mode, and communicate 530 over sidelink with the second UE 502 using the adjusted sidelink transmit-power.

Examples of Transmit-Power Control Mode Selection Based on UE Position

Figure 6:
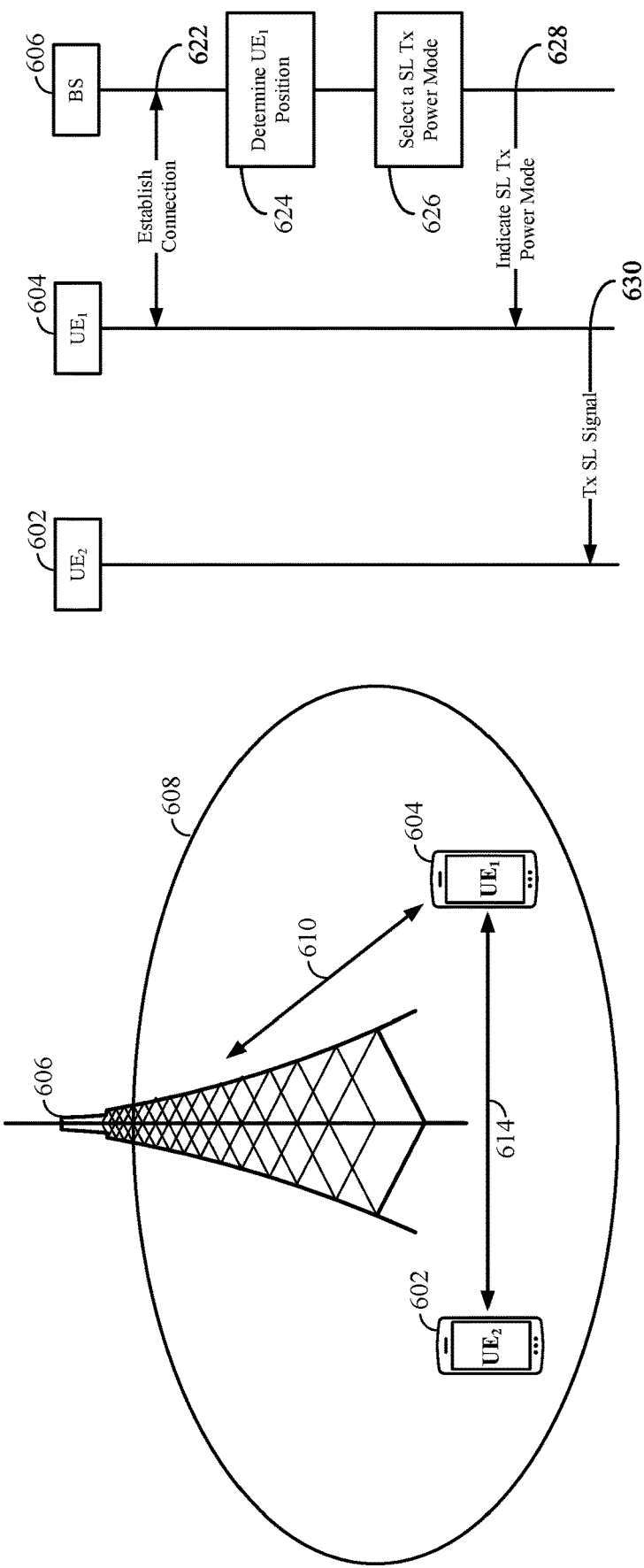
FIG. 6 is a diagram illustrating an exemplary scenario for adjusting a transmit-power control mode for controlling a sidelink transmit-power based on a UE position, in accordance with certain aspects of the present disclosure.

FIG. 6 is a diagram illustrating an exemplary scenario for adjusting a power control mode for controlling a sidelink transmit-power level at a UE based on a position of the UE. In this example, a first UE 604 is within cell coverage 608 and is connected to both a BS 606 via an access link 610, and a second UE 602 via a sidelink 614.

In some aspects of the disclosure, a position of the first UE 604 may be determinative of which sidelink transmit-power control mode should be used at the first UE 604. For example, the first UE 604 may be indoor or outdoor. In some examples, certain sidelink transmit-power control modes may be better suited for the first UE 604 depending on the position of the first UE 604. For example, if the first UE 604 is indoors, it may be assumed that the first UE 604 is moving slower, if it is moving at all. It may also be assumed that a higher transmit-power may cause a higher degree of interference in the indoor environment relative to an outdoor environment.

In some aspects of the disclosure, the BS 606 may determine a position of the first UE 604 using one or more of UE-based, UE-assisted, and/or network-based positioning modes. Positioning refers to functionality for detecting or determining a geographical position of a target UE (e.g., the first UE 604). In some examples, a network may have one or more location measurement units (LMUs) that support the BS 606 and assist certain methods for determining the position of the first UE 604. The BS 606 may also determine whether the first UE 604 is indoor or outdoor based on the determined position and/or based on the behavior of the first UE 604 (e.g., whether the UE is moving or stationary, whether UE movement speed is commensurate with driving or walking, etc.).

Once the BS 606 determines whether the first UE 604 is indoor or outdoor, the BS 606 may select a sidelink transmit-power control mode according to the determination of whether the UE 604 is indoor or outdoor, and transmit a signal to the first UE 604 to configure the first UE 604 for the selected sidelink transmit-power control mode. In some configurations, the BS 606 selects between an open-loop power control mode for an indoor UE position, and a closed-loop power control mode for an outdoor UE position.

It should be noted that the configuration signal from the BS 606 may be provided to the first UE 604 either implicitly or explicitly. In one example, the first UE 604 is preconfigured according to a wireless communication standard, or previously configured by the BS 606 to include one or more sidelink transmit-power control modes and/or parameters indexed according to a particular bit value in a field of the signal transmitted by the BS 606. In such an example, the BS 606 may communicate an indication of the selected sidelink transmit-power control mode to the first UE 604, and the first UE 604 may implement the particular transmit-power control mode and/or parameters associated with the signaling. In another example, the BS 606 may explicitly signal a particular sidelink transmit-power control mode and/or parameter to the first UE 604.

For example, the BS 606 and the first UE 604 establish a connection 622 on an access link (AL) for communication. At a first block 624, the BS 606 determines a position of the first UE 604. At a second block 626, the BS 606 proceeds to select a sidelink transmit-power mode 626 for the first UE 604 based on the determined position. The BS 606 communicates an indication 628 of the selected sidelink transmit-power mode to the first UE 604 over one or more of a system information block (SIB) or a radio resource control (RRC) message. Upon receiving the indication, the first UE 604 changes to the sidelink transmit-power control mode that corresponds to the control mode indicated by the BS 606. The first UE 604 may then adjust the sidelink transmit-power according to the sidelink transmit-power control mode, and communicate 630 over sidelink with the second UE 602 using the adjusted sidelink transmit-power.

Examples of Transmit-Power Control Mode Selection Based on UE Reports

Figure 7:
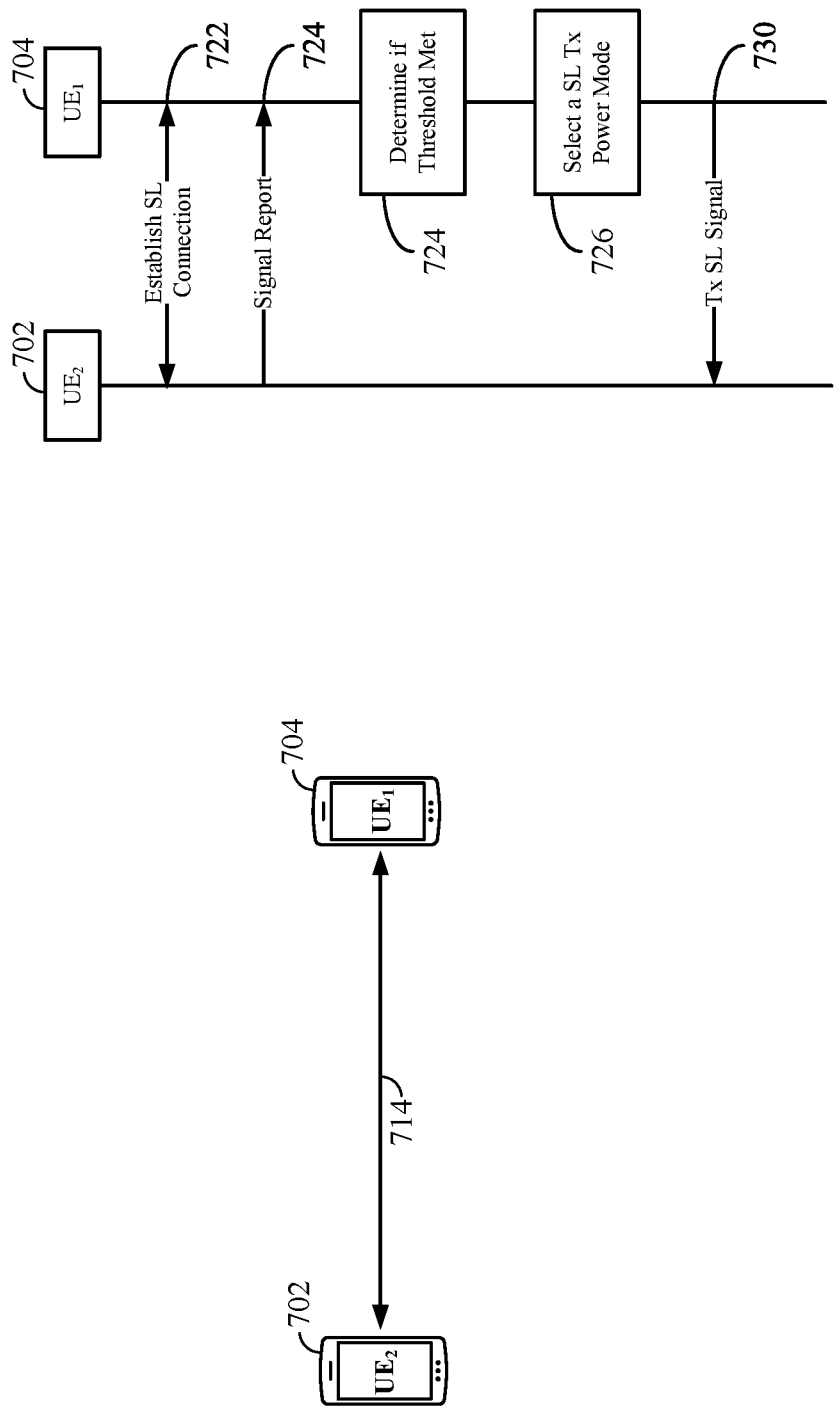
FIG. 7 is a diagram illustrating an exemplary scenario for adjusting a transmit-power control mode for controlling a sidelink transmit-power based on signal measurements, in accordance with certain aspects of the present disclosure.

FIG. 7 is a diagram illustrating an exemplary scenario for adjusting a power control mode for controlling a sidelink transmit-power level at a UE based on reports from one or more other UEs in the sidelink. In this example, a first UE 704 has established a sidelink 714 connection with a second UE 702.

In some aspects of the disclosure, a report of a measured sidelink signal may be determinative of which sidelink transmit-power control mode should be used at the first UE 704. For example, first UE 704 and second UE 702 may each be configured to perform physical layer measurements including received power measurements. For example, first UE 704 and second UE 702 may be configured to perform reference signal received power (RSRP), reference signal received quality (RSRQ), signal-to-interference-plus-noise ratio (SINR), reference signal received power per branch (RSRPB), etc. measurements on signals received over the sidelink 714. Based on these measurements, first UE 704 and second UE 702 can transmit a report to the other UE.

For example, first UE 704 and second UE 702 can establish a sidelink communication 722. The second UE 702 can perform a measurement on a signal it receives from the first UE 704 to determine the received signal power, and then communicate a signal report to the first UE 704, the signal report indicating one or more power measurement values from the performed signal measurement. At a first block 724, the first UE 704 may determine if the one or more power measurement values satisfy a threshold condition. For example, if a power measurement value is greater than a threshold value, then the threshold condition is met. However, if the power measurement value is less than the threshold value, then the threshold condition is not met. Once the first UE 704 determines if the threshold condition is met, at a second block 726, the first UE 704 may select a sidelink transmit-power control mode for controlling transmit-power over the sidelink. In some configurations, selecting the sidelink transmit-power control mode includes selecting an open-loop power control mode or a closed-loop power control mode. Once the first UE 704 selects the sidelink transmit-power control mode, the first UE 704 implements the mode and proceeds to communicated over the sidelink 730 using the selected sidelink transmit-power control mode.

In some examples, if the threshold condition is met, then the first UE 704 selects an open-loop power control mode, while if the threshold condition is not met, the first UE 704 selects a closed-loop control mode.

In some examples, if the second UE 702 reports a power measurement value that is less than the threshold value, the first UE 704 may proceed to select a transmit-power level instead of a transmit-power control mode. For example, the first UE 704 may select a maximum transmit-power level for transmitting data over the sidelink 714 with the second UE 702. In some aspects, the first UE 704 performs a signal power measurement on signals received from the second UE 702, and compares the measured values to a threshold value to determine if a threshold condition is met. If the threshold condition is not met (e.g., one or more measured values are less that the threshold value), then the UE may respond by selecting a maximum transmit-power level for transmitting data over the sidelink 714 with the second UE 702.

It should be noted that in some aspects, one or more of the first UE 704 or the second UE 702 may initiate and perform this type of transmit-power control with another UE in sidelink communication. For example, the performance of this type of transmit-power control may be based on a determination that one or more of the first UE 704 or the second UE 702 is not within cell coverage or within range of a BS.

Figure 8:
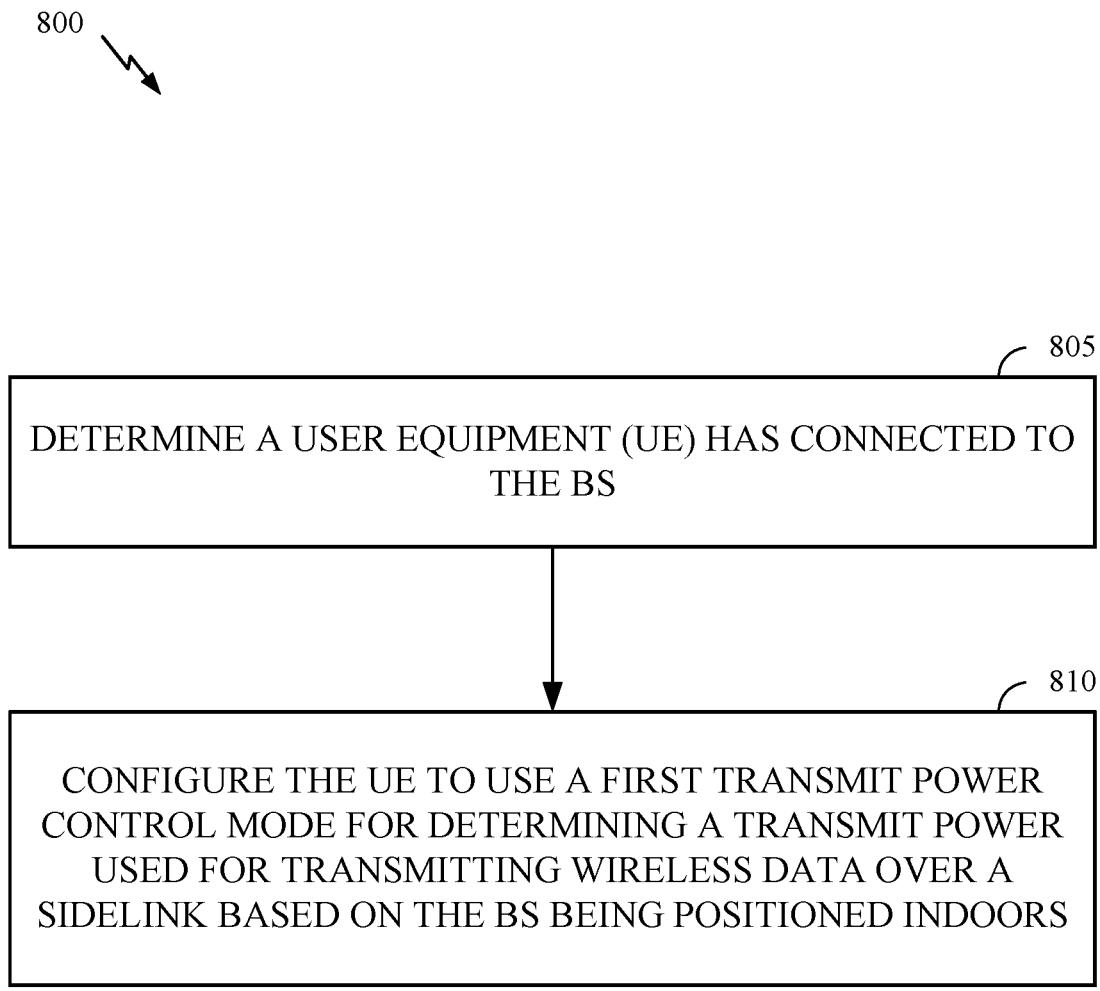
FIG. 8 is a flow diagram illustrating example operations for wireless communication at a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as a BS 110 in the wireless communication network 100). Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at step 805, by determining a UE (e.g., UE 120a) has connected to the BS.

The operations 800 proceed to step 810 by configuring the UE to use a first transmit-power control mode for determining a transmit-power used for transmitting wireless data over a sidelink based on the BS being positioned indoors.

In certain aspects, the first transmit-power control mode comprises an open-loop power control mode.

In certain aspects, configuring the UE comprises communicating an indication of the first transmit-power control mode to the UE via one or more of a system information block (SIB) or a radio resource control (RRC) message.

Figure 9:
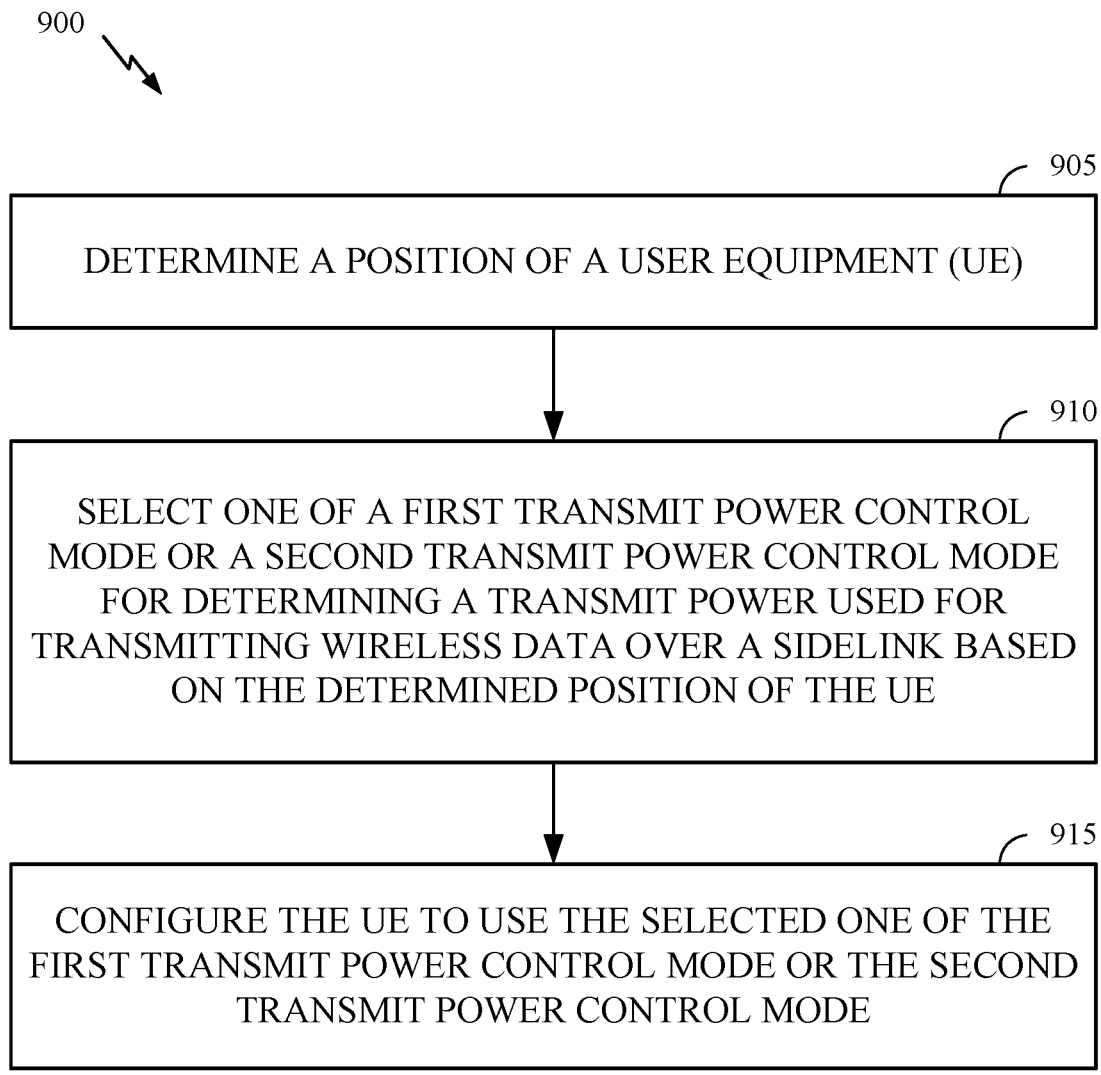
FIG. 9 is a flow diagram illustrating example operations for wireless communication at a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as a BS 110 in the wireless communication network 100). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at step 905, by determining a position of a user equipment (UE).

The operations 900 proceed to step 910 by selecting one of a first transmit-power control mode or a second transmit-power control mode for determining a transmit-power used for transmitting wireless data over a sidelink based on the determined position of the UE.

The operations 900 proceed to step 915 by configuring the UE to use the selected one of the first transmit-power control mode or the second transmit-power control mode.

In certain aspects, determining the position comprises determining whether the UE is in an indoor position or an outdoor position.

In certain aspects, the operations 900 also include receiving, from the UE, one or more of UE-based positioning information or UE-assisted positioning information, wherein determining the position of the UE is based on one or more of the UE-based positioning information or the UE-assisted positioning information.

In certain aspects, the operations 900 also include transmitting a reference signal, wherein the UE-assisted positioning information comprises results of measurements made by the UE based on the reference signal and at least one other reference signal transmitted by another BS.

In certain aspects, the UE-based positioning information comprises results of computations made by the UE based on data received from a location server.

In certain aspects, the first transmit-power control mode comprises an open-loop power control mode, and wherein the second transmit-power control mode comprises a closed-loop power control mode.

In certain aspects, the first power control mode is configured to provide a lower maximum transmission power for transmitting wireless data over the sidelink relative to the second power control mode.

Figure 10:
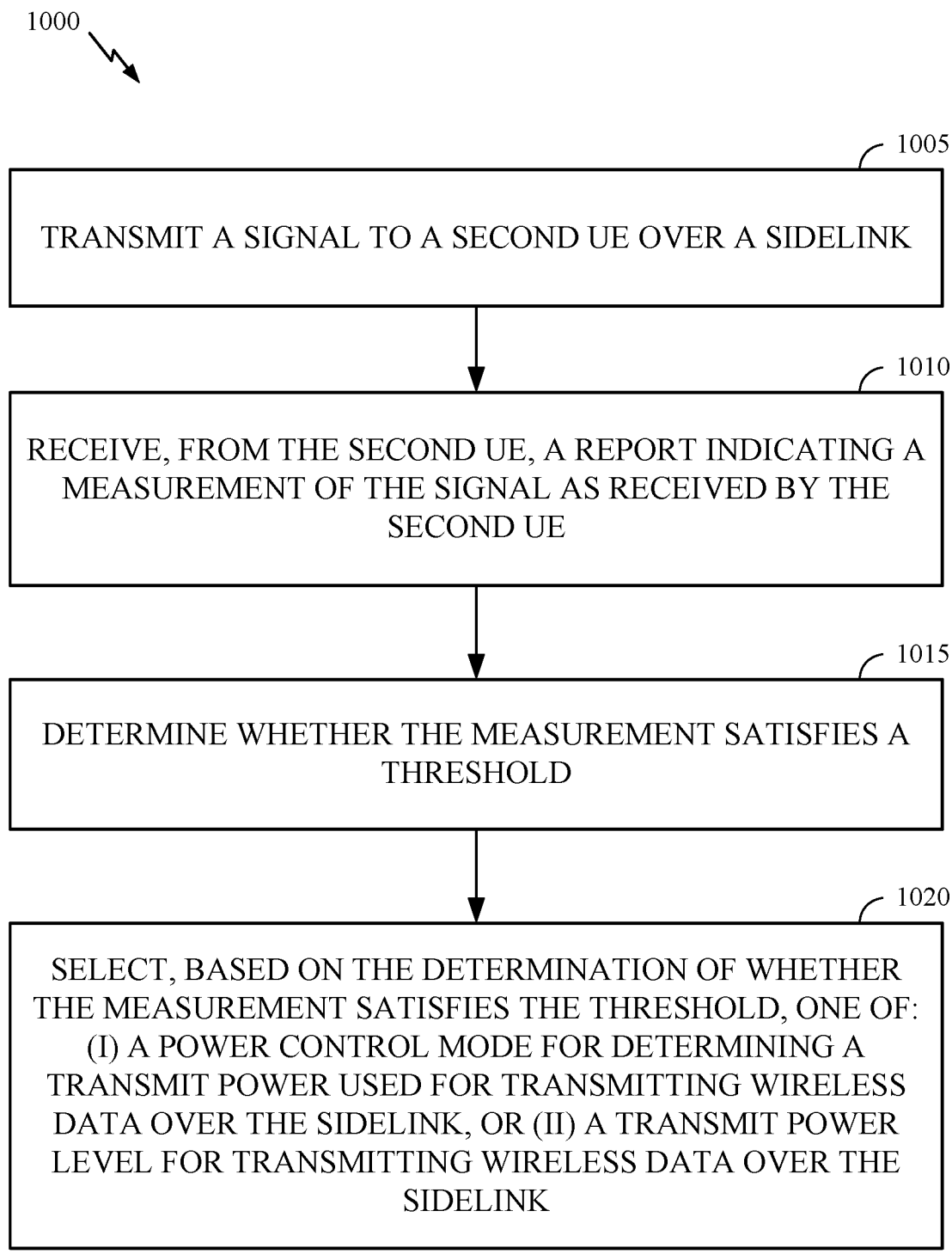
FIG. 10 is a flow diagram illustrating example operations for wireless communication at a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as a UE 120 in the wireless communication network 100). Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at step 1005, by transmitting a signal to a second UE over a sidelink.

The operations 1000 may proceed to step 1010 by receiving, from the second UE, a report indicating a measurement of the signal as received by the second UE.

The operations 1000 may proceed to step 1015 by determining whether the measurement satisfies a threshold.

The operations 1000 may proceed to step 1020 by selecting, based on the determination of whether the measurement satisfies the threshold, one of: (i) a power control mode for determining a transmit-power used for transmitting wireless data over the sidelink, or (ii) a transmit-power level for transmitting wireless data over the sidelink.

In certain aspects, if the measurement does not satisfy the threshold, the operations 1000 include selecting the transmit-power level for transmitting the wireless data, wherein the transmit-power level is a maximum level transmit-power for the first UE.

In certain aspects, if the measurement satisfies the threshold, the operations 1000 include selecting the power control mode for determining the transmit-power, wherein the power control mode is a closed loop power control mode or an open loop power control mode.

In certain aspects, the operations 1000 include selecting the closed loop power control mode or the open loop power control mode, wherein the selection is based on a reference signal received power (RSRP) measurement.

Figure 11:
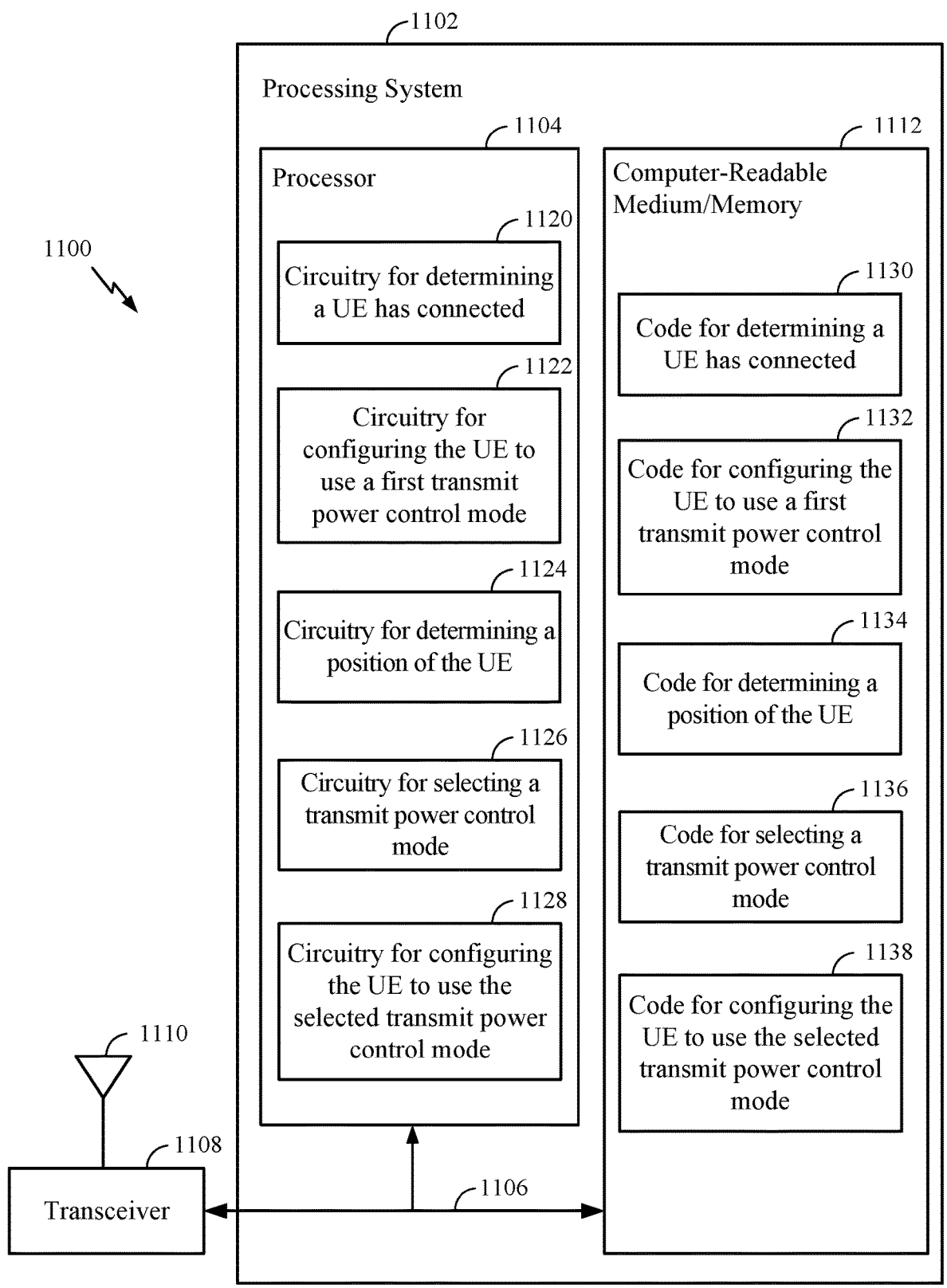
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 8 and 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 8 and 9, or other operations for performing the various techniques discussed herein for assigning or switching a sidelink transmit-power control mode. In certain aspects, computer-readable medium/memory 1112 stores code for determining a UE has connected to the BS 1130. In certain aspects, computer-readable medium/memory 1112 stores code for configuring the UE to use a first transmit-power control mode 1132. In certain aspects, computer-readable medium/memory 1112 stores code for determining a position of the UE 1134. In certain aspects, computer-readable medium/memory 1112 stores code for selecting a transmit-power control mode 1136. In certain aspects, computer-readable medium/memory 1112 stores code for configuring the UE to use the selected transmit-power control mode 1138. In certain aspects, the processor 1104 has circuitry configured to implement the code stored in the computer-readable medium/memory 1112. The processor 1104 includes circuitry for determining a UE has connected to the BS 1120, circuitry for configuring the UE to use a first transmit-power control mode 1122, circuitry for determining a position of the UE 1124, circuitry for selecting a transmit-power control mode 1126, and circuitry for configuring the UE to use the selected transmit-power control mode 1128.

Figure 12:
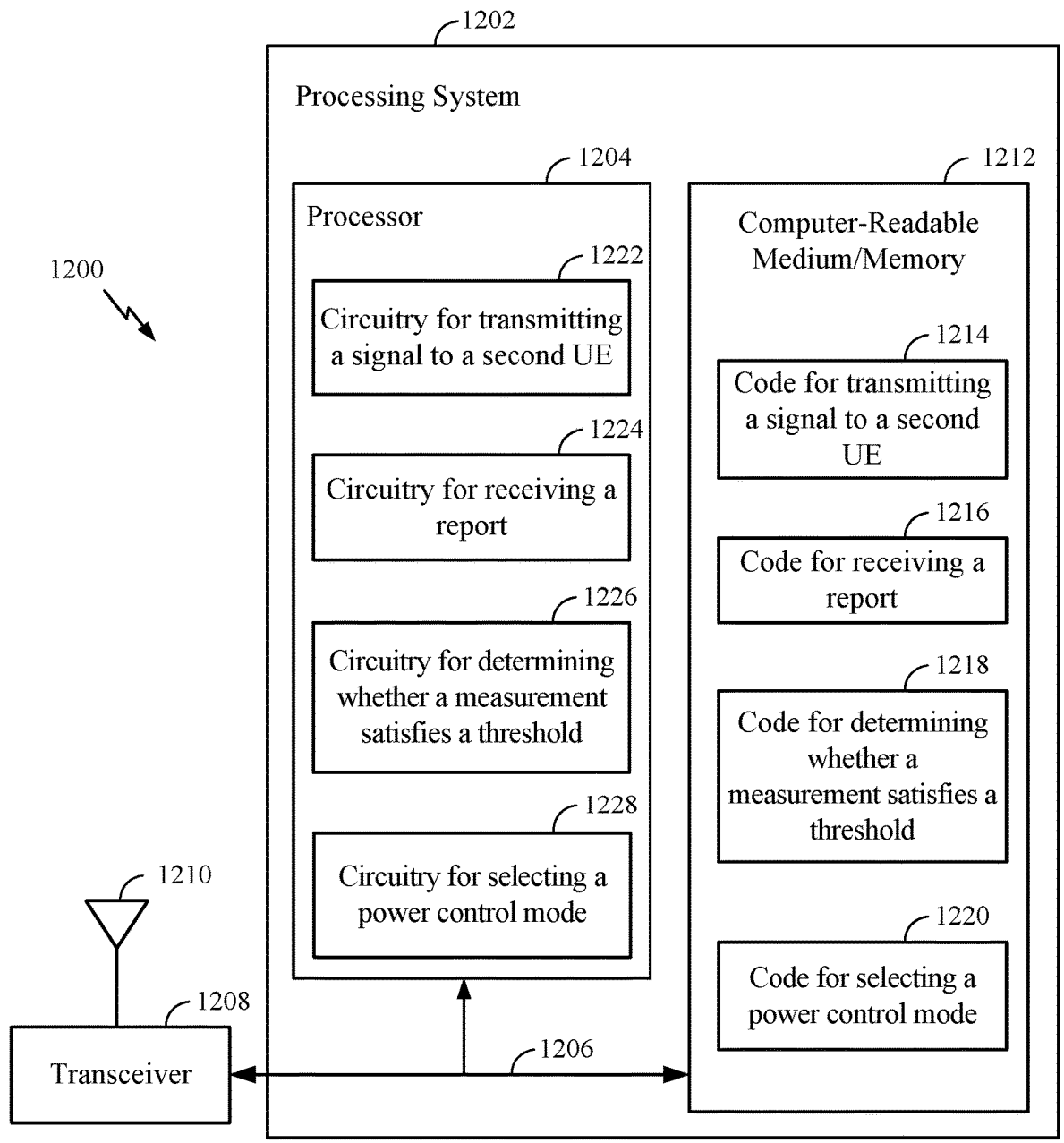
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for assigning or switching a sidelink transmit-power control mode. In certain aspects, computer-readable medium/memory 1212 stores code for selecting a power control mode 1214. In certain aspects, computer-readable medium/memory 1212 stores code for receiving a report 1216. In certain aspects, computer-readable medium/memory 1212 stores code for determining whether a measurement satisfies a threshold 1218. In certain aspects, computer-readable medium/memory 1212 stores code for selecting a power control mode 1220. In certain aspects, the processor 1204 has circuitry configured to implement the code stored in the computer-readable medium/memory 1212. The processor 1204 includes circuitry for transmitting a signal to a second UE 1222, circuitry for receiving a report 1224, circuitry for determining whether a measurement satisfies a threshold 1226, and circuitry for selecting a power control mode 1228.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or BS as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or BS can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a base station (BS), the method comprising:
    determining a UE has connected to the BS; and
    configuring the UE to use one of a first transmit-power control mode or a second transmit-power control mode for determining a transmit-power used for transmitting wireless data over a sidelink, wherein configuring the UE to use the first transmit-power control mode is based on the BS being positioned indoors, and wherein configuring the UE to use the second transmit-power control mode is based on the BS being positioned outdoors.

2. The method of claim 1, wherein the first transmit-power control mode comprises an open-loop power control mode, and wherein the second transmit-power control mode comprises a closed-loop power control mode.

3. The method of claim 1, wherein configuring the UE comprises communicating an indication of the first transmit-power control mode to the UE via one or more of a system information block (SIB) or a radio resource control (RRC) message.

4. A method for wireless communication by a base station (BS), comprising:
   determining a position of a user equipment (UE);
   selecting one of a first transmit-power control mode or a second transmit-power control mode for determining a transmit-power used for transmitting wireless data over a sidelink based on the determined position of the UE; and
   configuring the UE to use the selected one of the first transmit-power control mode or the second transmit-power control mode.

5. The method of claim 4, wherein determining the position comprises determining whether the UE is in an indoor position or an outdoor position.

6. The method of claim 4, further comprising receiving, from the UE, one or more of UE-based positioning information or UE-assisted positioning information, wherein determining the position of the UE is based on one or more of the UE-based positioning information or the UE-assisted positioning information.

7. The method of claim 6, further comprising transmitting a reference signal, wherein the UE-assisted positioning information comprises results of measurements made by the UE based on the reference signal and at least one other reference signal transmitted by another BS.

8. The method of claim 6, wherein the UE-based positioning information comprises results of computations made by the UE based on data received from a location server.

9. The method of claim 4, wherein the first transmit-power control mode comprises an open-loop power control mode, and wherein the second transmit-power control mode comprises a closed-loop power control mode.

10. The method of claim 4, wherein the first transmit-power control mode is configured to provide a lower maximum transmission power for transmitting wireless data over the sidelink relative to the second transmit-power control mode.

11. A method for wireless communication by a first user equipment (UE), comprising:
   transmitting a signal to a second UE over a sidelink;
   receiving, from the second UE, a report indicating a measurement of the signal as received by the second UE;
   determining whether the measurement satisfies a threshold; and
   selecting, based on the determination of whether the measurement satisfies the threshold, one of: (i) a power control mode for determining a transmit-power used for transmitting wireless data over the sidelink, or (ii) a transmit-power level for transmitting wireless data over the sidelink.

12. The method of claim 11, wherein if the measurement does not satisfy the threshold, selecting the transmit-power level for transmitting the wireless data, wherein the transmit-power level is a maximum level transmit-power for the first UE.

13. The method of claim 11, wherein if the measurement satisfies the threshold, selecting the power control mode for determining the transmit-power, wherein the power control mode is a closed loop power control mode or an open loop power control mode.

14. The method of claim 13, further comprising selecting the closed loop power control mode or the open loop power control mode, wherein the selection is based on a reference signal received power (RSRP) measurement.

15. A base station (BS) for wireless communication comprising:
   a processor; and
   a memory communicatively coupled to the processor, wherein the processor is configured to:
      determine a UE has connected to the BS; and
      configure the UE to use one of a first transmit-power control mode or a second transmit-power control mode for determining a transmit-power used for transmitting wireless data over a sidelink, wherein configuring the UE to use the first transmit-power control mode is based on the BS being positioned indoors, and wherein configuring the UE to use the second transmit-power control mode is based on the BS being positioned outdoors.

16. The BS of claim 15, wherein the first transmit-power control mode comprises an open-loop power control mode, and wherein the second transmit-power control mode comprises a closed-loop power control mode.

17. The BS of claim 15, further comprising communicating an indication of the first transmit-power control mode to the UE via one or more of a system information block (SIB) or a radio resource control (RRC) message.

18. A base station (BS) for wireless communication, comprising:
   a processor; and
   a memory communicatively coupled to the processor, wherein the processor is configured to:
      determine a position of a user equipment (UE);
      select one of a first transmit-power control mode or a second transmit-power control mode for determining a transmit-power used for transmitting wireless data over a sidelink based on the determined position of the UE; and
      configure the UE to use the selected one of the first transmit-power control mode or the second transmit-power control mode.

19. The BS of claim 18, further comprising determining whether the UE is in an indoor position or an outdoor position.

20. The BS of claim 18, wherein the processor is further configured to receive, from the UE, one or more of UE-based positioning information or UE-assisted positioning information, wherein determining the position of the UE is based on one or more of the UE-based positioning information or the UE-assisted positioning information.

21. The BS of claim 20, wherein the processor is further configured to transmit a reference signal, wherein the UE-assisted positioning information comprises results of measurements made by the UE based on the reference signal and at least one other reference signal transmitted by another BS.

22. The BS of claim 20, wherein the UE-based positioning information comprises results of computations made by the UE based on data received from a location server.

23. The BS of claim 18, wherein the first transmit-power control mode comprises an open-loop power control mode, and wherein the second transmit-power control mode comprises a closed-loop power control mode.

24. The BS of claim 18, wherein the first transmit-power control mode is configured to provide a lower maximum transmission power for transmitting wireless data over the sidelink relative to the second transmit-power control mode.

25. A first user equipment (UE) for wireless communication comprising:
a processor; and
a memory communicatively coupled to the processor, wherein the processor is configured to:
transmit a signal to a second UE over a sidelink;
receive, from the second UE, a report indicating a measurement of the signal as received by the second UE;
determine whether the measurement satisfies a threshold; and
select, based on the determination of whether the measurement satisfies the threshold, one of: (i) a power control mode for determining a transmit-power used for transmitting wireless data over the sidelink, or (ii) a transmit-power level for transmitting wireless data over the sidelink.

26. The first UE of claim 25, wherein if the measurement does not satisfy the threshold, the processor is further configured to select the transmit-power level for transmitting the wireless data, wherein the transmit-power level is a maximum level transmit-power for the first UE.

27. The first UE of claim 25, wherein if the measurement satisfies the threshold, the processor is further configured to select the power control mode for determining the transmit-power, wherein the power control mode is a closed loop power control mode or an open loop power control mode.

28. The first UE of claim 27, wherein the processor is further configured to select the closed loop power control mode or the open loop power control mode, wherein the selection is based on a reference signal received power (RSRP) measurement.

* * * * *